(12) United States Patent
Prothmann et al.

(10) Patent No.: US 9,115,623 B2
(45) Date of Patent: Aug. 25, 2015

(54) METHOD FOR CONTROLLING THE NOX CONCENTRATION IN THE EXHAUST GAS OF AN INTERNAL COMBUSTION ENGINE

(71) Applicant: MTU FRIEDRICHSHAFEN GMBH, Friedrichshafen (DE)

(72) Inventors: Michael Prothmann, Friedrichshafen (DE); Andreas Flohr, Friedrichshafen (DE); Joerg Remele, Hagnau (DE); Martin Lehmann, Kressbronn (DE); Alexander Bernhard, Meckenbeuren (DE); Andreas Krammer, Bodolz (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 277 days.

(21) Appl. No.: 14/049,106

(22) Filed: Oct. 8, 2013

(65) Prior Publication Data
US 2014/0083083 A1    Mar. 27, 2014

Related U.S. Application Data

(63) Continuation-in-part of application No. PCT/EP2012/001491, filed on Apr. 4, 2012.

(30) Foreign Application Priority Data

Apr. 14, 2011   (DE) .......................... 10 2011 017 036

(51) Int. Cl.
| | |
|---|---|
| *F01N 3/00* | (2006.01) |
| *F01N 3/18* | (2006.01) |
| *F02D 41/00* | (2006.01) |
| *F02D 41/14* | (2006.01) |
| *F02D 41/40* | (2006.01) |

(52) U.S. Cl.
CPC .............. *F01N 3/18* (2013.01); *F02D 41/0007* (2013.01); *F02D 41/0052* (2013.01); *F02D 41/1448* (2013.01); *F02D 41/1461* (2013.01); *F02D 41/401* (2013.01); *F01N 2560/026* (2013.01); *F02D 2041/1432* (2013.01); *Y02T 10/144* (2013.01); *Y02T 10/44* (2013.01); *Y02T 10/47* (2013.01)

(58) Field of Classification Search
USPC ............................ 60/274, 276, 285, 297, 301
See application file for complete search history.

(56) References Cited

U.S. PATENT DOCUMENTS

| | | | | |
|---|---|---|---|---|
| 7,150,144 | B2 * | 12/2006 | Nakagawa et al. | 60/277 |
| 7,281,368 | B2 * | 10/2007 | Miyake et al. | 60/285 |

(Continued)

FOREIGN PATENT DOCUMENTS

| | | |
|---|---|---|
| DE | 101 48 651 | 3/2003 |
| DE | 43 33 424 | 2/2004 |
| DE | 103 33 933 | 2/2005 |

(Continued)

*Primary Examiner* — Binh Q Tran
(74) *Attorney, Agent, or Firm* — Klaus J. Bach

(57) ABSTRACT

In a method for controlling the NOx concentration in the exhaust gas of an internal combustion engine in which an NOx control deviation is calculated from an actual NOx value and a desired NOx value, a control value is calculated based on the NOx control deviation via an NOx controller and by means of the control value at least one condition of the cylinder inlet flow volume of the internal combustion engine is adjusted in that, additionally, an adaption injection begin is determined in dependence on the control value of the NOx controller, and the injection begin is changed by the adaption injection begin.

7 Claims, 5 Drawing Sheets

(56) References Cited

U.S. PATENT DOCUMENTS

| | | | |
|---|---|---|---|
| 8,161,944 B2 * | 4/2012 | Moriya et al. | 123/435 |
| 8,245,567 B2 * | 8/2012 | Wang et al. | 73/114.75 |
| 2007/0186538 A1 | 8/2007 | Dollmeyer et al. | |
| 2008/0010973 A1 * | 1/2008 | Gimbres | 60/276 |

FOREIGN PATENT DOCUMENTS

| | | |
|---|---|---|
| DE | 11 2007 001 009 | 3/2009 |
| EP | 1 398 483 | 3/2004 |
| WO | WO 2006/039452 | 4/2006 |
| WO | WO 2010/070199 | 6/2010 |

* cited by examiner

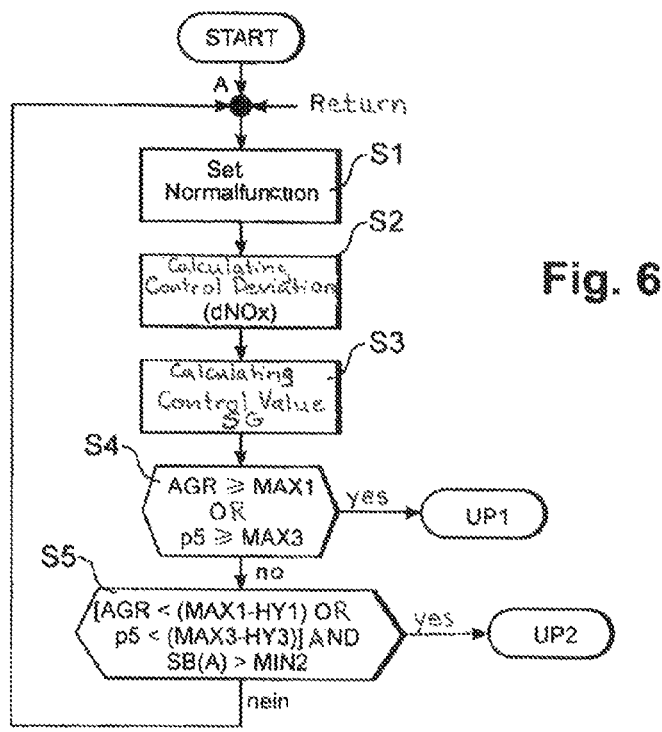
Fig. 6
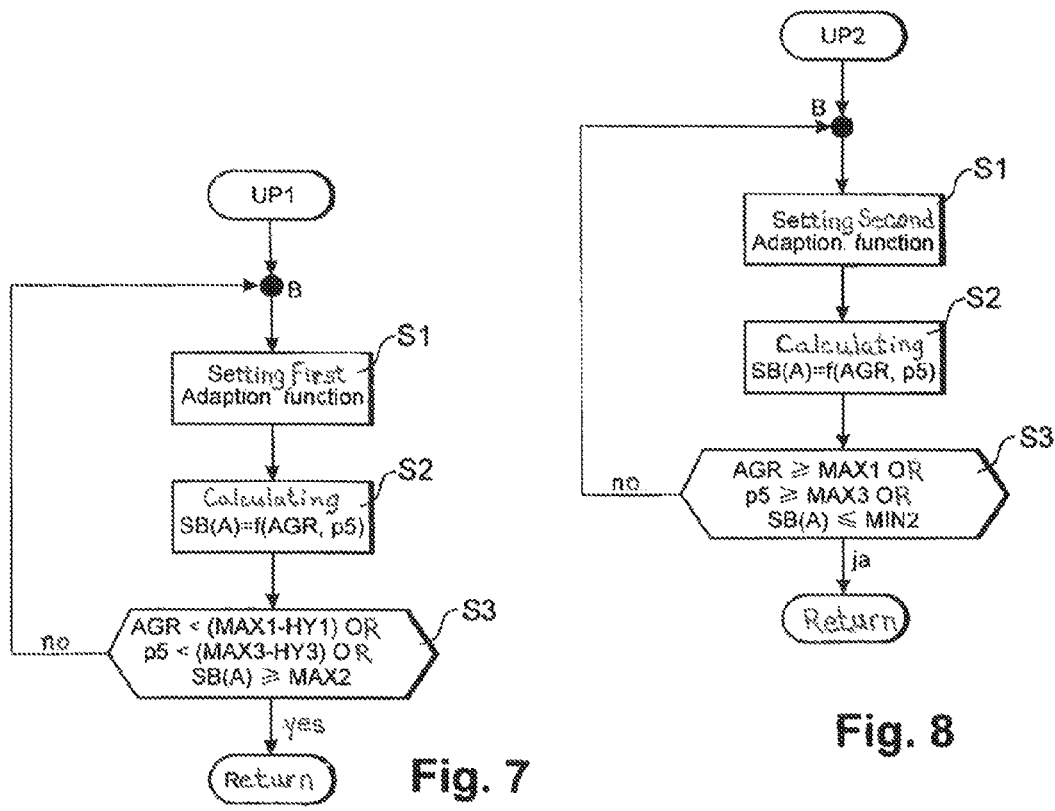
Fig. 7
Fig. 8

METHOD FOR CONTROLLING THE NOX CONCENTRATION IN THE EXHAUST GAS OF AN INTERNAL COMBUSTION ENGINE

This is a Continuation-In-Part of pending international patent application PCT/EP2012/001491 filed Apr. 4, 2012 and claiming the priority of German patent application 10 2011 017 036.7 filed Apr. 11, 2011.

BACKGROUND OF THE INVENTION

The invention resides in a method for controlling the $NO_x$ concentration in the exhaust gas of an internal combustion engine wherein, based on an $NO_x$ control error or deviation, a control value is determined for adjusting the $NO_x$ concentration.

For maintaining the legal $NO_x$ emission limit values of an internal combustion engine, the internal combustion engine is operated in a controlled manner. DE 103 33 933 A1 discloses a particular method and arrangement for achieving this task. In this method first an $NO_x$ control error or deviation from a desired $NO_x$ value is determined. Based on the determined $NO_x$ control error a controller determines a control value. Then via a performance graph, an exhaust gas flow rate is assigned to the control value. In addition, a logic is provided which examines the emissions based on the particle control deviation and the $NO_x$ control deviation. Upon determination of a deviation from the optimum values the logic causes the controller to control or adjust the respective control device by adjusting the respective control value. In this method, it is however possible that a certain control deviation remains in effect.

It is therefore the principal object of the present invention to provide an $NO_x$ control circuit which optimizes the control quality.

SUMMARY OF THE INVENTION

In a method for controlling the NOx concentration in the exhaust gas of an internal combustion engine in which an NOx control deviation is calculated from an actual NOx value and a desired NOx value, a control value is calculated based on the NOx control deviation via an NOx controller and by means of the control value at least one condition of the cylinder inlet flow volume of the internal combustion engine is adjusted in that, additionally, an adaption injection begin is determined in dependence on the control value of the NOx controller, and the injection begin is changed by the adaption injection begin.

In a method for controlling NOx concentration in the exhaust gas of an internal combustion engine wherein an NOx control error (dNOx) is determined from an actual $NO_x$ value ($NO_x$)$1^{sr}$)) and a desired $NO_x$ value (NOx (SL), a control value (SG) is calculated from the $NO_x$ control error (dNOx) via an NOx controller and by means of the control value (SG) at least one condition value of the cylinder inlet flow of the internal combustion engine is adjusted. Additionally, an adaption injection begin (SB(A)) is changed depending on the control value (SG) of the NOx controller and the injection begin (SB) is changed. A condition value of the cylinder inlet flow in the sense of the invention is the charge air pressure and/or the recirculated exhaust as volume.

The adaption injection begin causes a change of the injection begin when the NOx controller is in its positive or negative end position, that is, when the respective control member, for example, the exhaust gas recirculation valve is at a stop. The adoption injection begin is determined in that the control value of the NOx controller is evaluated based on limit values and, depending on the evaluation, a first adaption function, a second adaption function or a normal function is put in place. With the first adaption function, the injection begin is retarded by means of the adaption injection begin. "Retarded" means that the injection begins at a smaller crankshaft angle before the upper dead center position, for example at 5° before the upper dead center position instead of 7° before the upper dead center position. With the second adaption function, the injection begin is advanced, for example, to 10° before the upper dead center position rather than 5°. With the normal function, the injection begin remains unchanged.

The method according to the invention is at because of its easy conversion since the conversion can take place completely in the software of the engine control. The simple conversion is apparent also in that only the limit values of the adaption are dated and complicated adjustments are not necessary. Lasting control deviations are effectively prevented in that the adaption injection begin becomes effective when the stroke of the adjustment value of the NOx controller is not sufficient for reducing the NOx control deviation.

The invention will become more readily apparent from the following the description of a preferred exemplary embodiment thereof with reference to the accompanying drawings.

BRIEF DESCRIPTION OF THE DRAWINGS

FIG. 6 shows a program flow plan,
FIG. 7 shows a subprogram,
and
FIG. 8 shows another subprogram.

DESCRIPTION OF AN EXEMPLARY EMBODIMENT

Figure 1:
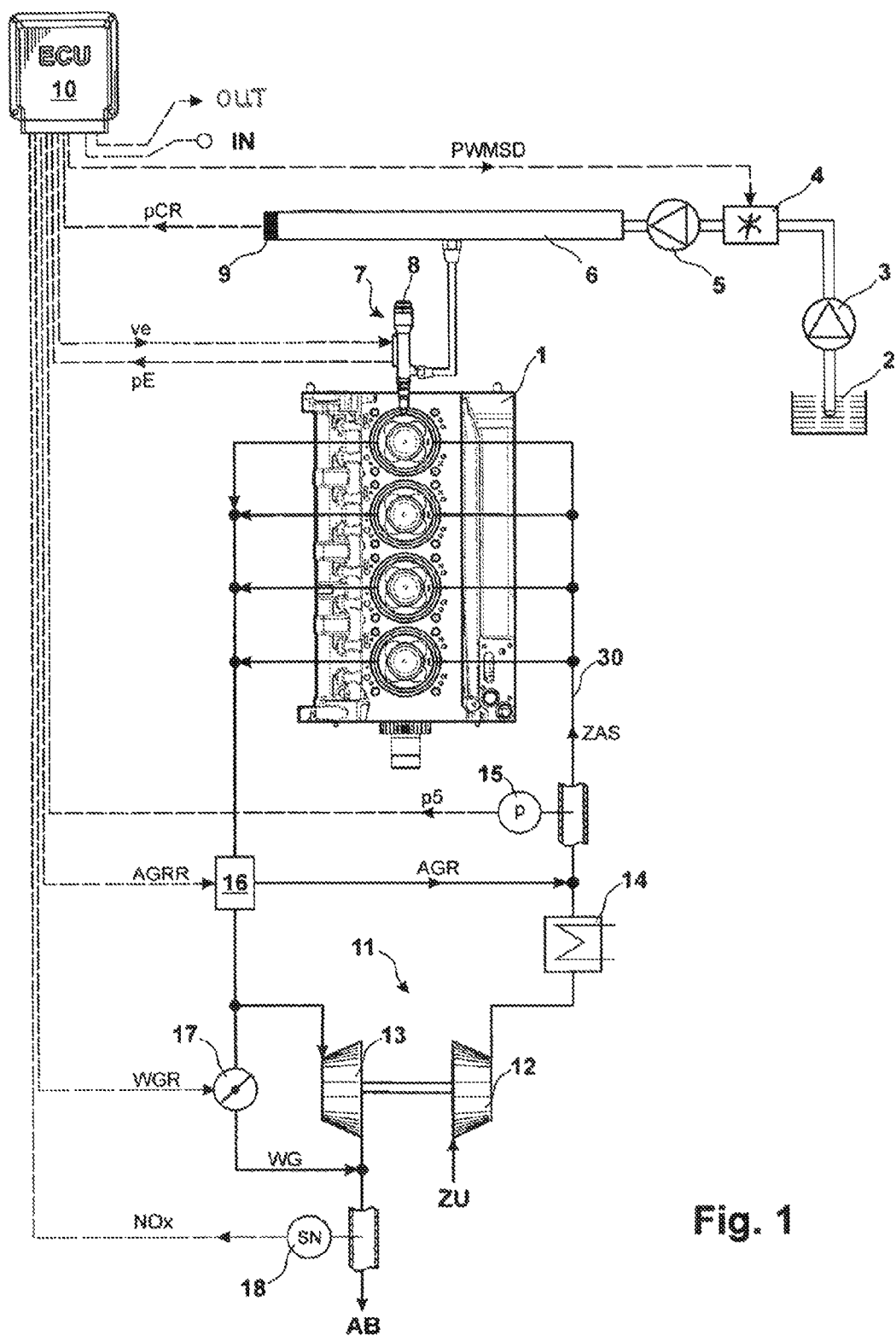
FIG. 1 shows a system diagram.

FIG. 1 shows a fuel injection system diagram of an electronically controlled internal combustion engine 1 with single-stage charging and exhaust gas recirculation (AGR). Fuel is injected via a common rail system. Its operation is well known. The mechanical components are a fuel tank 2, a low pressure pump 3, a suction throttle 4, a high pressure pump 5, a rail 6, and injectors 7 for injecting fuel into the combustion chambers of the internal combustion engine. Into the injector 7 optionally, an individual storage chamber 8 is integrated forming an additional buffer volume.

The single-stage charging with exhaust gas recirculation comprises an exhaust gas turbocharger 11 with a compressor 12 as well as a turbine 13, a charge air cooler 14, an AGR valve 16 for adjusting the flow of the recirculated exhaust gas and a waste gate 17 for bypassing the turbine 13 of the exhaust gas turbocharger 11. The functioning of the single-stage charging and the exhaust gas recirculation is well-known. The arrangement additionally includes a pressure sensor 15 for determining the charging pressure, signal; p5, and an NOx sensor 18 downstream of the turbine 13.

The way the internal combustion engine 1 is operated is determined by an electronic control unit (ECU) 10. The electronic control unit 10 includes the usual components of a microcomputer system such as a microprocessor, I/0 components buffer and storage components (EEPROM, RAM). The storage components include the relevant operating data in the form of performance graphs and characteristic lines. Based on these performance graphs and characteristic lines, the electronic control unit 10 determines from the input values the output values. In FIG. 1 for example, the following input values are presented: the rail pressure pCR which is measured by means of an individual rail pressure sensor 9, an individual storage chamber pressure pE, the pressure level p5 of the charge air, the NOx raw values of the NOx sensor 18 and an inlet pressure EIN. The inlet pressure value EIN includes the additional sensor signals, for example the engine speed or a gas pedal position signal.

FIG. 1 shows as output values of the electronic control unit 10 a PWM signal PWMSD for controlling the suction throttle 4, which forms a pressure control member, a signal ve for controlling the injectors 7, a control signal WGR for the waste gate, a control signal AGRR for the AGR value 18, and an output value AUS. The signal ve represents an injection begin (SB) and an injection end. The output value AVS represents the additional control signals for controlling the internal combustion engine 1.

The exhaust gas flow WG bypassing the turbine 13 is adjusted by the control signal WGR for the waste pate 17. By means of the bypassing exhaust gas flow WG, on the other hand, the charging pressure p5 in an inlet line 30 of the internal combustion engine 1 is adjusted as a result of the mechanical coupling of the turbine 13 and the compressor 12. The charging pressure p5 therefore represents a value of the cylinder inlet flow ZAS of the internal combustion engine. By way of the control signal AGRR, the recirculated exhaust gas flow AGR is adjusted. The recirculated exhaust gas flow AGR represents therefore another value of the cylinder inlet flow ZAS of the internal combustion engine 1.

Figure 2:
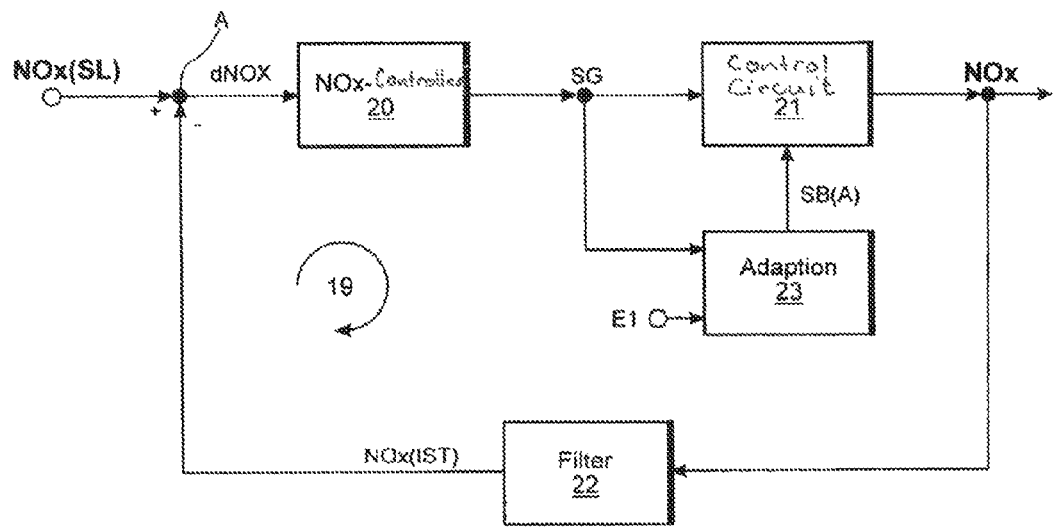
FIG. 2 shows an NOx-control circuit with adaption.

FIG. 2 shows an NOx control circuit 19 for controlling the nitrogen oxide emissions. The input value for the NOx control circuit, that is, the guide value, is the desired NOx value NOx (SL). The output value of the NOx control circuit, that is the control value, is the NOx raw value of the nitrogen oxide emissions. The elements of the NOx control circuit are an NOx controller 20, typically with PID behavior, the control circuit section 21 and a (software) filter 22. The NOx raw values are filtered by way of the optional filter 22. The filtered values correspond to the actual NOx value NOx (IST). At a summation point A, the NOx actual value NOx (IST) and the desired NOx value NOx (SL) are compared whereby the NOx control deviation is determined. Based on the NOx control deviation dNOx the NOx controller 20 calculated its control signal SG. Based on the control signal SG at least the cylinder inlet flow volume of the internal combustion engine is adjusted for example via the charging pressure (FIG. 1, page 5). Then the control circuit section 21 corresponds, depending on the particular embodiment, to the waste gate and/or the exhaust gas recirculation valve. By way of the NOx sensor (FIG. 1: 18) the nitrogen oxide emissions in the exhaust gas are determined. At this point, the NOx control circuit 19 is closed.

The NOx control circuit may be provided with an adaption 23 whereby the NOx controller 20 and the adaption 23 form a master-slave arrangement, in which the NOx controller is the master and the adaption 23 is the slave. The input values for the adaption 23 are the control value SG of the NOx controller 20 and an input value E1, which represents various limit values (see FIG. 3). The output value of the adaption 23 is an adaption injection begin SB(A). By means of the adaption injection begin SB(A), the injection begin is changed, for example by adding the adaption injection begin to the injection begin. Typically, the injection begin is calculated by way of a performance graph depending on the operating point of the internal combustion engine, for example depending on the performance requirements and the engine speed.

Figure 3:
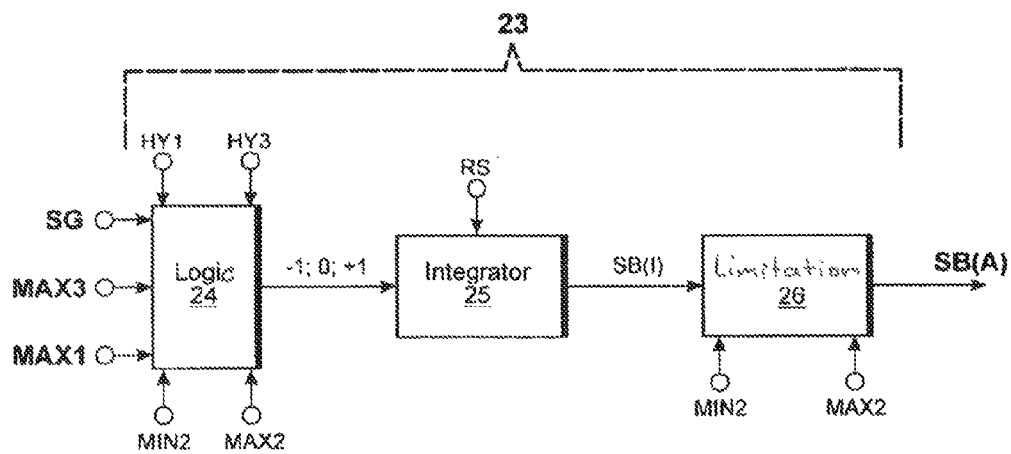
FIG. 3 shows a block diagram of the adaption.

Further explanations are provided with reference to FIG. 3, which shows a block diagram of the adaption 23. The adaption comprises a logic 24, an integrator 25 as I-controller and a limiter 26. By way of the logic 24, the control value SG is evaluated based on limit values and the integrator 25 is cleared. The given limit values as shown are a maximum value MAX1 for evaluating the recirculated exhaust gas AGR and a maximum value MAX3 for evaluating the charging pressure p5, and also two limit values for evaluating the adaption injection begin SB(A), that is, a minimum value MIN2 and a maximum value MAX2. For improving the stability with regard to the recirculated exhaust gas AGR, a hysteresis value HY1 and with regard to the charging pressure p5 a hysteresis value HY3 are provided as further input values. The out values of the logic 24, that is in this case the values +1, 0, −1, are added up by the integrator 25. Via the signal RS, the integrator 25 can be reset. The integrated injection begin SB(1), that is the output signal of the integrator 25, is then limited by the limiter 26. If the integrated injection begin SB(1) is between the second minimum value MIN2 and the second maximum value MAX2, the value of the adaption injection begin SB(A) is identical with the integrated injection begin SB(1). Otherwise, the integrated injection begin SB(1) is limited to the second minimum value MIN2 or the second maximum value MAX2.

The functionality of the adaption 23 resides in that the adaption is always activated when the control value of the $NO_x$ controller is at the positive or the negative stop. "At the positive or negative stop" means that the respective control member, for example, the AGR valve is mechanically at the stop. With the adaption activated, a first adaption function or a second adaption function is set dependent on the control value SG of the NOx controller or the normal function is maintained or respectively, re-established. If, for example, the charging pressure p5 is greater than the maximum value MAX3, the first adaption function is set and a value −1 is issued by the logic 24. With the first adaption function set via the adaption injection begin SB(A), the injection begin is retarded. The various states are explained in connection with FIG. 4.

In a variation of FIG. 3, which is not shown, the logic and the integrator are replaced by a controller with at least PI action (performance). In this embodiment, in addition to the simple data input, the larger control range is advantageous since it is possible to intervene via two control members, in this case the AGR valve and the waste gate.

Figure 4:
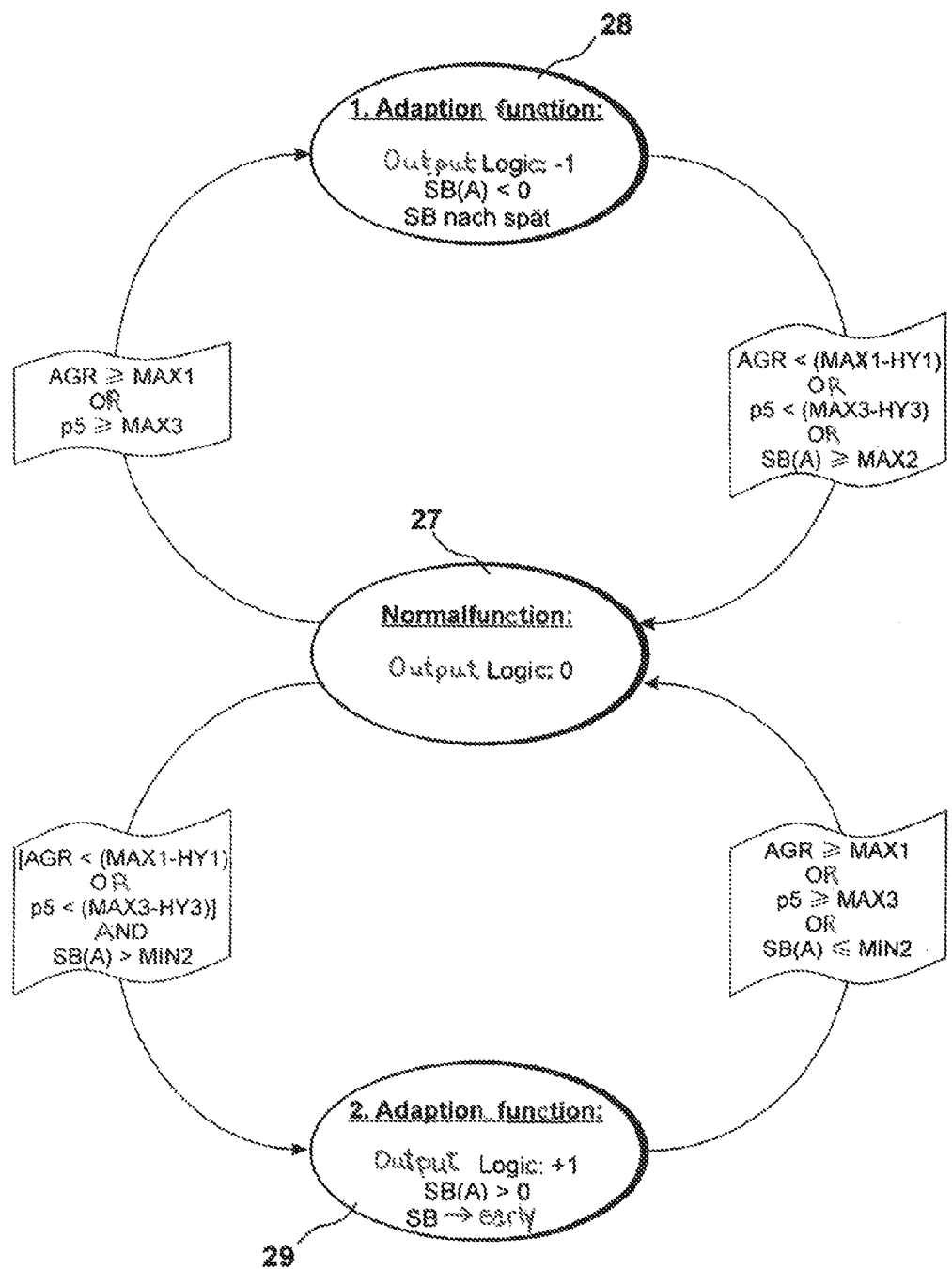
FIG. 4 shows a status diagram.

FIG. 4 shows a status diagram. The reference numeral 27 indicates the normal function. The normal function 27 is set when the control value SG of the NOx controller is within a predetermined value range, that is a range in which the NOx controller can control the NOx deviation on its own. By way of the control value SG of the NOx controller, the operating values of the cylinder inlet flow of the internal combustion engine are adjusted. The operating values of the cylinder inlet flow in context with the present invention are the charging pressure p5 [bar] and/or the content of recirculated exhaust gas [%]. When now the desired NOx value is lowered, a negative NOx control deviation will occur. As a result, the NOx controller will increase the control value SG. When one of the operating values of the cylinder inlet flow exceeds a limit value, the first adaption function 28 is activated, that is when the recirculated exhaust gas content AGR becomes larger/equal the maximum value MAX1 or when the charger air pressure p5 becomes larger than/equal to the maximum value MAX3. In praxis, the two limit values represent the physical stop of the AGR valve (FIG. 1: 16) and waste gate (FIG. 1.: 17). In other words, the NOx controller, that is the master, is at the positive stop and as a result, is at the end of its control capacity. With the adaption function 28 activated, a negative adaption injection begin SB(A) is then calculated, for example SB(A)=−2°. In this way, the actual injection begin, which is for example 5° before upper dead center, is changed to a new value of 3° before upper dead center. The functionality of the first adaption function 28 resides therefore in changing the NOx momentary value via the adaption injection begin SB(A) in such a way that the blocked master (NOx controller) is returned into a control range.

When the master is again operative, its control value SG is lowered. The first adaption function is then again deactivated and the normal function becomes again effective when the recirculation exhaust gas flow AGR is again smaller than the maximum value MAX1, reduced by the hysteresis value HY1 or when the charging pressure p5 becomes smaller than the maximum value MAX3 reduced by the hysteresis value HY3 or when the adaption injection begin SB(A) is larger/equal to the maximum value MAX2.

With a positive NOx control deviation that is when the NOx actual value is smaller than the desired NOx value, the NOx controller reduces its control value SG. If now, with a set normal function 27 set, it is recognized that either the exhaust gas recirculation value AGR becomes smaller than the maximum value MAX1 reduced by the hysteresis value HY1 or that the charging pressure p5 becomes smaller than the maximum value. MAX3 reduced by the hysteresis value HY3 and if further at the same time the adaption injection begin SB(A) is greater than the minimum value MIN2, a second adaption function 29 is activated. Via the second adoption function 29, the injection begin is advanced. With the second adaption function 29 activated, a positive adaption injection begin SB(A) is calculated by the adoption 23. For example, SB(A)=+2°, for the numerical example mentioned earlier, then an injection begin of 7° before upper dead center will be established. The functionality of the second adaptation function 29 resides therefore in that the blocked master (NOx controller) is returned to a controllable range. The second adaption function 29 is then reset and returned to the normal function. when the recirculated exhaust gas volume AGR is greater/equal to the maximum value MAX1 or when the charging pressure p5 is greater/equal the maximum value MAX3 or when the adaption injection begin SB(A) becomes smaller/equal the minimal value MIN2. Upon return to the normal function 27, the momentary value of the adaption injection begin SB(A) is maintained.

Figure 5A:
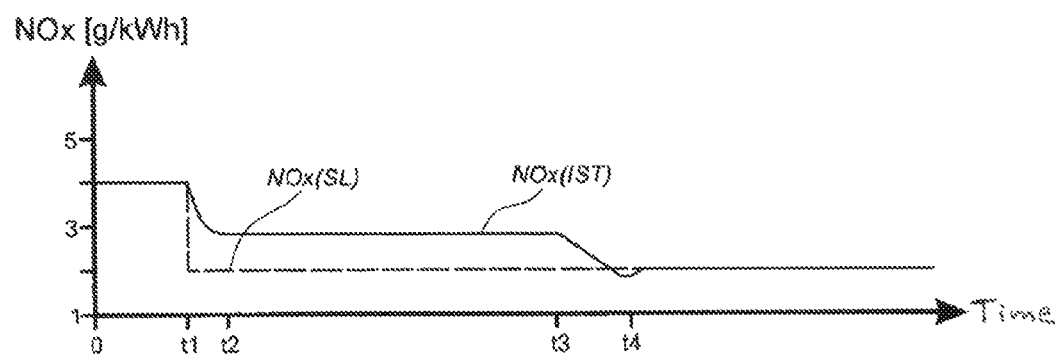
FIGS. 5A, 5B and 5C show time diagrams.
Figure 5B:
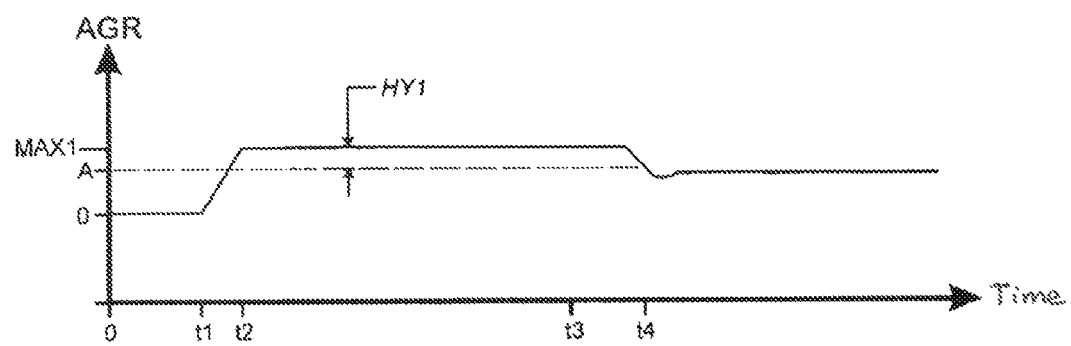
Figure 5C:
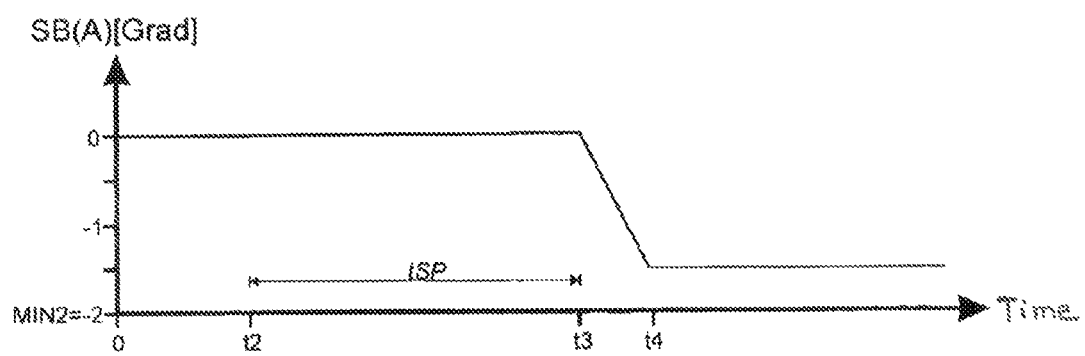

FIG. 5 shows a time diagram. FIG. 5 comprises FIGS. 5A-5C. FIG. 5A shows NOx emission values in gram/kilowatt hours (g/kWh), FIG. 5B shows an example of the recirculated exhaust gas volume AGR and FIG. 5C shows the adaption injection begin SB(A) in degrees of crankshaft angle. In FIG. 5A, the actual NOx value (NOx(IST)) is shown by the full line and the desired NOx value (NOx(SL)) is shown by the dashed line.

Ahead of the point in time t1, the internal combustion engine is in a normal operating state. In the normal operating state, the actual NOx value NOx(IST) corresponds to the desired NOx value NOx(SL), that is, the NOx control deviation is zero. Herein, the NOx controller calculates a control value SG of zero. As a result, the normal function (FIG. 4: 27) is set. With the normal function set, the adaption injection begin is inactivated. At the point in time t1, the desired NOx value is reduced from the original value NOx(SL)=4 g/kWh to the new value NOx(SL)=2 g/kWh. As a result of the now negative NOx control deviation, the NOx controller increases successively its control value SG. As a result, the re-circulated exhaust gas volume AGR is increased. At the point in time t2, the NOx controller reaches its positive stop. In FIG. 5B, the re-circulated exhaust gas volume equals the maximum value MAX1. At the point in time t2, the NOx controller, that is the master, can no longer control the cylinder inlet flow volume, that is, the re-circulated exhaust gas AGR and/or the charging pressure p5. In other words, the waste gate and the AGR valve are physically at the stops. After a blocking period tSP (period t2/t3) first an adaption function is activated. The blocking period may of course also be zero. With the first adaption function activated, a negative adaption injection begin SB(A) is calculated via the adaption. In FIG. 5C, therefore the adaption injection begin is changed from SB(A)=0 degrees toward SB(A)=−1.5 degrees, that is, it is retarded. As a result of the later injection begin, the NOx actual value NOx(IST) decreases starting at the point in time t3, whereupon the NOx controller reduces its control value SG starting at the point in time t4. At the point in time t4, the recirculated exhaust gas volume AGR drops below the limit value MAX1 by the hysteresis value HY1 (FIG. 5B). Since now the NOx controller is again safely in its control range, a return from the first adaption function to the normal function occurs. Also at the point in time t4, the adaption injection begin SB(A) has reached its final value SB(A)=−1.5 degrees.

FIG. 6 shows the method in a program sequence plan representing the main program. After initialization, the normal function is set in S1. Then, in S2 the NOx control deviation dNOx is calculated based on the desired NOx value NOx(SL) and the actual NOx value NOx(IST). Depending on the NOx control deviation dNOx, the NOx controller again determines its control value SG at S3. Via the control value SG, the cylinder inlet flow condition values of the internal combustion engine are defined. The condition values of the cylinder inlet flow are in accordance with the present invention, the charging pressure p5 and/or the recirculated exhaust gas component AGR. At S4, it is then examined whether the recirculated exhaust gas volume AGR is greater/equal the maximum value MAX1 or whether the charging pressure p5 is creator/equal the maximum value MAX3. If the answer in S4 is yes, in a branch to a subprogram UP1 is follows which corresponds to the first adaption function. This is shown in FIG. 7 and will be explained with reference to FIG. 7. If it is determined in S4 that neither of the two condition values exceeds the respective maximum value, answer is no, a branch to S5 is followed. In S5, it is examined whether the recirculated exhaust gas volume flow AGR is smaller than the maximum value MAX1 reduced by the hysteresis value HY1 or whether the charging pressure p5 is smaller than the maximum value MAX3 reduced by the hysteresis value HY3. In addition, it is examined whether the adaption injection begin SB(A) is greater than the minimum value MIN2. If this is true, that is, the result of 55 is yes, the branch subprogram UP2 shown in FIG. 8 is entered. Otherwise, with the answer no in S5, the program returns to point A that is, the normal function remains set.

FIG. 7 shows the subprogram UP1. The subprogram UP1 is entered when in S4 of the FIG. 6, the answer was positive. This program is also followed when the NOx controller can no longer control the condition values of the cylinder inlet flow because the waste gate and/or the AGR valve are at their mechanical stops. In S1 then the first adaption function is activated. Then in S2, the adaption injection begin SB(A) is calculated following the procedure of FIG. 3. Subsequently, it is examined in S3 whether the recirculated exhaust gas flow volume AGR is smaller than the maximum value MAX1 reduced by a hysteresis value HY1 or whether the charging pressure p5 is smaller than the maximum value MAX3 reduced by a hysteresis value HY3 or whether the adaption injection begin SB(A) is greater than/equal to a maximum value MAX2. If this is not the case, answer in S3 is no, then a branch back to point B is followed. Otherwise, if the answer in S3 is yes, a branch back to the main program of FIG. 6, point A is followed.

FIG. 8 shows the subprogram UP2. The subprogram UP2 is entered if in S5 of FIG. 6 the answer is positive. Then, at S1, the second adaption function is activated. Subsequently, in S2, the adaption infection begin SB(A) is calculated in accordance with FIG. 3. Then, in S3 it is examined whether the recirculated exhaust gas flow volume AGR is greater/equal the maximum value MAX1 or whether the charging pressure (p5) is greater/equal the maximum value MAX3 or whether the adaption injection begin SB(A) is smaller/equal the minimum value (MIN2). If this is not the case, answer in S3 is no, a branch point B is followed. Otherwise, that is when the answer in S3 is yes, a return branch to the main program of FIG. 6, point A, is followed.

REFERENCE NUMERALS

1 Internal combustion engine
2 Fuel tank
3 Low pressure: pump
4 Suction throttle
5 High pressure pump
6 Rail
7 Injector
8 Individual storage chamber
9 rail pressure sensor
10 Electronic control unit
11 Exhaust gas turbocharger
12 Compressor
13 Turbine
14 Charge air cooler
15 Pressure sensor, charge air
16 Exhaust gas recirculation valve
17 Waste gate
18 NOx sensor
19 NOx control circuit
20 NOx controller
21 Control circuit section
22 Filter
23 Adaption
24 Logic
25 integrator
26 limit
27 Normal function
28 First adaption function
29 Second adaption function
30 Inlet line

What is claimed is:

1. A method for controlling the NOx concentration in the exhaust gas of an internal combustion engine (1), comprising the steps of:
    calculating an NOx control deviation (dNOx) of a momentary NOx value (NOx(IST)) from a desired NOx value (NOx(SL)),
    calculating based on the NOx control deviation (dNOx) by way of a NOx controller (20) a control value (SG) needed for minimizing the $NO_x$ control deviation ($d(NO_x)$) and adjusting, via the control value (SG), at least one of a charging pressure (p5) and also a recirculated exhaust gas flow volume (AGR) of the internal combustion engine (1),
    additionally determining a first adaption injection begin (SB(A)) by an evaluation of the control value (SG) of the NOx controller (20) based on limit values and selecting, in dependence on this evaluation, a first adaption function (28), a second adaption function (29) or a normal function 27, and
    with the first adoption function activated, retarding the injection begin (SB) by the adaption injection begin (SB(A)), with the second adaption function (29) activated, advancing the injection begin (SB) by way of the adaption injection begin (SB(A)) and, with the normal function (27) activated, keeping the injection begin (SB) unchanged.

2. The method according to claim 1, wherein the first adaption function is activated when the recirculated exhaust gas flow volume (ACR) is greater than, or equal to, a flow volume maximum value (MAX1) or when the charging pressure (p5) is greater than, or equal to, a maximum pressure value (MAX3).

3. The method according to claim 2, wherein the first adaption function (28) is reset and the normal function (27) is reactivated when the recirculated exhaust gas flow volume (AGR) is smaller than the flow volume maximum value (MAX1) reduced by a flow hysteresis value (HY1) or when the charging pressure (p5) is smaller than the maximum pressure value (MAX3) reduced by a pressure hysteresis value (HY3) or when the adaption injection begin (SB(A)) is greater than, or equal to, a maximum injection begin value (MAX2).

4. The method according to claim 1, wherein the second adaption function (29) is activated when the recirculated exhaust gas volume (AGR) is smaller than the flow volume maximum value (MAX1) reduced by the low hysteresis value (HY1) or when the charging pressure (p5) is smaller than the maximum pressure value (MAX3) reduced by the pressure hysteresis value (HY3) and when additionally the adaption injection begin (SB(A)) is greater than a minimum value (MIN2).

5. The method according to claim 4, wherein the second adaption function (29) is reset and the normal function (27) is reactivated when the recirculated exhaust gas flow volume (ACR) is greater than, or equal to, the flow volume maximum value (MAX1) or when the charging pressure (p5) is greater than, or equal to, the maximum pressure value (MAX3) or when the adaption injection begin (SB(A)) is smaller than, or equal to, the minimum injection begin value (MIN2).

6. The method according to claim 1, wherein the adaption injection begin (SB(A)) is calculated by assigning to the control value (SG) of the NOx controller (20) via the logic (24) a control value, the control value is added via an integrator (25) and is limited by a limiter (26).

7. The method according to claim 6, wherein the adaption injection begin (SB(A)) is calculated by way of a controller with at least PI behavior rather than via the integrator (25).

* * * * *